United States Patent

[11] 3,591,253

| [72] | Inventor | James J. De Palma |
| --- | --- | --- |
| | | Rochester, N.Y. |
| [21] | Appl. No. | 838,716 |
| [22] | Filed | July 2, 1969 |
| [45] | Patented | July 6, 1971 |
| [73] | Assignee | Eastman Kodak Company |
| | | Rochester, N.Y. |

[54] REAR PROJECTION SCREEN
10 Claims, 2 Drawing Figs.

[52] U.S. Cl. .................................................. 350/126,
264/1
[51] Int. Cl. ................................................ G03b 21/60
[50] Field of Search ........................................ 350/117;
161/3.5; 264/1

[56] References Cited
UNITED STATES PATENTS

| 2,287,556 | 6/1942 | Land ............................ | 350/126 |
| --- | --- | --- | --- |
| 3,372,971 | 3/1968 | Quackenbush et al. ...... | 350/125 X |

FOREIGN PATENTS

| 769,422 | 10/1969 | Canada ........................ | 350/126 |
| --- | --- | --- | --- |

Primary Examiner—Louis R. Prince
Assistant Examiner—Joseph W. Roskos
Attorneys—William H. J. Kline, Robert F. Crocker and Lloyd F. Seebach ABSTRACT: A rear projection screen comprising a sheet of polymeric material, the sheet being of sufficient thickness to be self-supporting and having improved optical characteristics. More specifically, the sheet of material is preferably made from the polyolefins, for example, polyethylene or polypropylene, that has been prepared in such a way so as to have a generally crystalline structure.

PATENTED JUL 6 1971　　　　　　　　　3,591,253

JAMES J. DePALMA
INVENTOR.

BY
*Lloyd F. Seebach*
AGENT

REAR PROJECTION SCREEN

FIELD OF THE INVENTION

The present invention relates to a rear projection screen and more particularly to a rear projection screen made from a polymeric material, such as the polyolefins, for example, polypropylene, polyethylene, etc. and having low scintillation and high brightness characteristics.

DESCRIPTION OF THE PRIOR ART

Rear projection screens, which are presently commercially available, can be divided into two broad categories; namely, those that receive the aerial image from the projector and redirect the light primarily by scattering, and those that redirect the light primarily by refraction-reflection. A scattering type of screen is one which employs a dispersion of very small particles in a carrier medium. In this type of screen, redirection of the light can usually be controlled to some extent by the difference of refractive index between the scattering particles and the carrier; by the size, shape and concentration of the particles; by the amount of absorption which takes place in the carrier; and by the type of screen surface, namely, matte, specular, absorbing or nonabsorbing.

A refraction-reflection type screen redirects the light by means of the lens and mirror action of the relatively large elements which form a part of the screen. These elements can be transparent spheres made of glass or plastic which are embedded as a monolayer in either an opaque or a transparent carrier. A surface of a generally transparent carrier can also be embossed with a plurality of spherical surfaces, cylindrical surfaces or aspherical surfaces.

One problem or disadvantage common to all rear projection screens is that such a screen scintillates badly and has hot spots. Screen scintillation is the appearance of tiny sparkling spots over the entire surface of the screen and a hot spot is an area of the screen which is distinctly brighter than the remainder of the screen. The problem of scintillation has not been eliminated by any of the presently commercial screens, whereas hot spots can be eliminated, but at considerable cost. For example, one way to remove hot spots and insure even field illumination is to place a Fresnel lens on a sheet behind or in front of the viewing screen. For very small screens the Fresnel lens could be pressed into or formed as part of the screen per se in order to reduce cost, but this procedure becomes impractical when the screen attains a relatively large size.

Any rear projection screen can be evaluated in terms of its optical characteristics, for example, contrast, brightness, scintillation and hot spots. An ideal rear projection screen would be one having no hot spots, practically no scintillation and a high degree of brightness within the audience space desired with good contrast in accordance with the aforementioned optical characteristics. The elimination of hot spots and screen scintillation is of primary importance, because these tend to induce eye fatigue with any long period of continual viewing.

A method by which the relative merits and acceptability of a given rear projection screen material can be evaluated for each of the aforementioned characteristics in a somewhat subjective manner is to assign a progressive numerical value for each of the characteristics. For example, if a value of 0—9 is assigned to each characteristic with a rating of 0 being indicative of the very poorest quality and rating of 9 being indicative of the best possible quality, then the evaluated numerical rating for each of the four characteristics can be added together to determine a particular quality or "Q-rating" for any given screen material. Such evaluations are assigned when a material is tested under actual conditions by projecting an image on the screen in a conventional manner. By this method a theoretically perfect screen would have a "Q-rating" of 36 and a screen of inferior quality would have a correspondingly lower "Q-rating." This method, as described above, is not all inclusive because it relies on an individual's visual analysis which can and will vary from person to person. However, the method does provide a way of evaluating the characteristics of different screen materials so that at least a subjective comparison can be made. A more practical "Q-rating" might be obtained, if the same evaluations were made by several persons and then averaged.

A conventional rear projection screen (A) comprising a glass plate coated with a wax diffusing layer has a "Q-rating" of 24 which was determined as follows:

| Screen | Hot spot | Scintillation | Contrast | Brightness | Q rating |
|---|---|---|---|---|---|
| A | 9 | 2 | 8 | 5 | 24 |

This evaluation shows that the screen scintillates considerably and that the image is not particularly bright. While one evaluation might give a high "Q-rating," another might give a lower rating, such that an average can be obtained. The average becomes more meaningful as the number of evaluations by different people of the same screen is increased. Several other commercially available screens have been rated by this method as follows:

| Screen | Hot spot | Scintillation | Contrast | Brightness | Q rating |
|---|---|---|---|---|---|
| B | 7 | 8 | 9 | 4 | 28 |
| C | 9 | 2 | 9 | 4 | 24 |

From the evaluations comprising the "Q-ratings," it should be evident that each of the conventional screens A, B, and C had at least one major shortcoming which, in fact, detracted significantly from its overall desirability as a rear projection screen.

SUMMARY OF THE INVENTION

The primary object of the invention is to provide a rear projection screen having improved optical characteristics.

Another object of the invention is to provide a rear projection screen which is made from a polymeric material and has improved optical characteristics.

Still another object of the invention is to provide a rear projection screen which is made for a polymeric material such as the polyolefins, for example, polypropylene or polyethylene, and is of a generally crystalline structure with improved optical characteristics.

These and other objects and advantages of the invention will be apparent to those skilled in the art by the description which follows.

The objects of the invention are attained by making a rear projection screen from a sheet of polymeric material, the sheet being of sufficient thickness to be self-supporting and having improved optical characteristics. More specifically, the sheet of material is preferably made from the polyolefins, for example, polyethylene or polypropylene, that has been prepared in such a way so as to have a generally crystalline structure. The process is described in more detail in a copending application, Ser. No. 838,528, filed July 2, 1969, in the name of Edward D. Morrison.

The screen material is generally of crystalline structure and comprises a crystal formation known as a spherulite with some, if any, surrounding amorphous medium. It has been found that a screen made of polymeric material, such as the polyolefins, that is, polyethylene, polypropylene or their mixture under controlled conditions has higher "Q-rating" than any known commercially available rear projection screen and on the basis of the method of evaluation described above, has the following characteristics:

| Screen | Hot spot | Scintillation | Contrast | Brightness | Q rating |
|---|---|---|---|---|---|
| I | 7 | 8 | 9 | 7 | 31 |

DESCRIPTION OF THE DRAWING

Reference is now made to the accompanying drawing in which like reference numerals designate like parts and wherein.

DESCRIPTION OF THE PREFERRED EMBODIMENT

Figure 1:
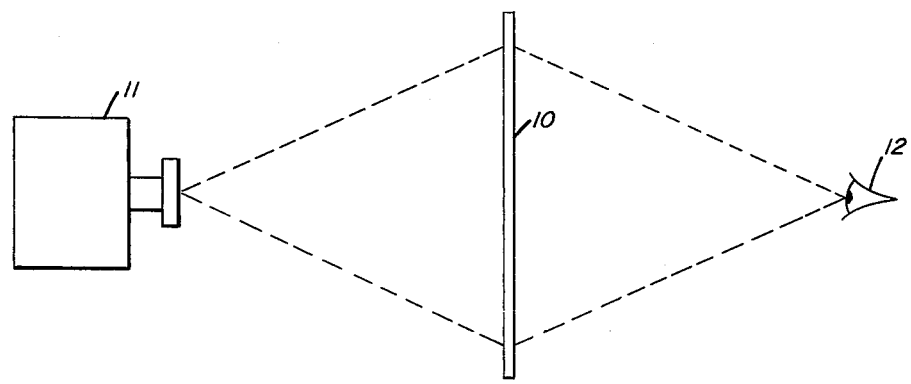
FIG. 1 is a schematic view showing the arrangement of a rear projection screen relative to a projector and a viewer.

With reference to FIG 1 a rear projection screen 10 is normally positioned between a projector 11 and a viewing audience or individual as designated by number 12. With this particular arrangement, the image light is projected onto one side of the screen, is transmitted through the screen and viewed from the opposite side. Commercially available screens of this type produce scintillation which degrades the sharpness and resolution of the image so that when the image is viewed for a long period of time, it is also inducive of eye fatigue.

An investigation was made of the characteristics of various types of natural and synthetic waxes, and it was observed that a different crystal morphology developed with each different setting, temperature, rate of cooling and thickness of the wax layer. One such screen, which was produced by pouring melted paraffin wax into a thin cell and then cooling it, was found upon photometric evaluation to have less scintillation, particularly when the melted wax allowed to cool and set slowly, rather than being set at a fast rate by subjecting it to a very low temperature. While the resulting screen had less scintillation and high brightness, it possessed many disadvantages, for example, it was too soft, abraded readily, was not pliable and fractured very easily. Further, the melting point of most waxes is relatively low so that it is only under certain conditions that such a screen could be used and used consistently. Also, after a period of time, it was noted that the wax tends to separate from the glass and crazes as well.

In view of the above disadvantages of a wax screen, it occurred that the chemical composition of certain polymers is somewhat similar to that of waxes. As a result, it was found that the crystal morphology of wax could be generally simulated by certain polymetric materials, but that the method of fabricating the screen material is of a critical nature. In evaluating various types of polymetric materials produced under different conditions, it was found that conventional pressing or extrusion techniques followed by normal chill roll, water or air cooling are completely unacceptable for producing a screen material having the desired improved characteristics. The annealing temperature is very critical with optimum results being obtained only if the polymer is annealed at a temperature just below its melting point. Photomicrographs reveal that in such a temperature range, spherulitic growth can occur and it is this generally crystalline structure, namely these spherulites which give the screen its unique light diffusing characteristics. A spherulite can be defined as a large number of crystals radiating in all directions from a point, a particular direction of each crystal being consistently along the radius of a sphere.

Any crystalline structure having optical qualities generally equivalent to or similar to those of a crystal, such as a spherulite, can be considered to be a domain. Accordingly, a discrete spherulite with any surrounding amorphous medium can be considered to be a domain. Morphology and photometric studies of various polymeric materials, such as the polyolefins, for example, polypropylene, polyethylene, etc., polystyrenes, polycarbonates, polyesters, polyamides, polyurethanes, polyvinyl alcohols, esters, and ethers, etc. indicate that a screen of any one of such materials will have similar characteristics, for example, random distribution of spherulites which average in size from about 5 to about 20 microns in diameter. With such distribution and size, a screen having improved scintillation and brightness characteristics is obtained.

Figure 2:
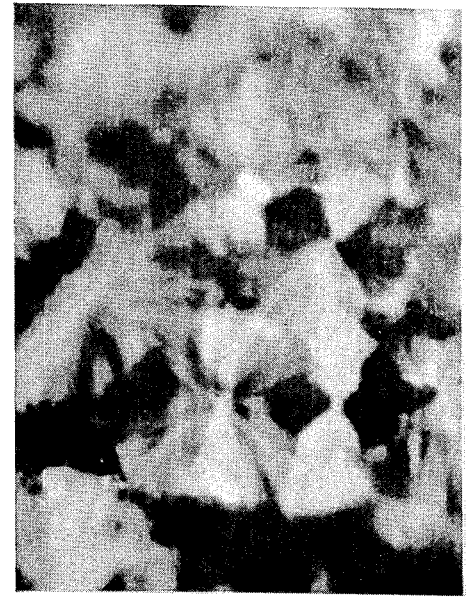
FIG. 2 is a vertical section, greatly magnified, taken through a sheet of polypropylene showing the generally crystalline structure of the material.

With reference to FIG. 2, it can be seen that the cross section of a sheet of polyethylene shows the spherulites to be randomly oriented. With such distribution of the spherulites a maximum diffusion of light is obtained with a minimum of scintillation. The 90 percent, are of a size as noted above and comprise at least 60 percent preferably from about 60 percent to about 90 percent, of the screen mass. The thickness of the screen can vary, but it has been found that a thickness of about 20 to 80 mils will provide a screen of good rigidity with good light diffusion characteristics. With a thickness less than 20 mils, scintillation increases at a rapid rate and the turbidity decreases so that the screen becomes almost completely transparent.

Inasmuch as the sperulitic growth is determined by such factors as, material, thickness of the material, temperature, etc. the spherulite size will not be uniform nor will the spherulitic be homogeneous in their distribution and orientation. Accordingly, any of the material mentioned above that can be used as a screen material can be said to be anisotropic in that such materials have different properties in different directions as evidenced by the definition of a spherulite.

A medium density polyethylene was melted and held at a temperature of about 175° for 2 minutes while stirring slowly to remove any bubbles. The melt was poured into form comprising a metal sheet with 0.030 inch shims at the edges. A metal cover plate was placed over and in contact with the melt in the form and a pressure of about 139 pounds per square inch was applied while the melt was allowed to cool to 120° C., the pressure being maintained for about an hour as cooling took place. The pressure was then removed and the melt allowed to cool to room temperature at which time it was removed from the form.

Variations in this process included immediate chill setting and modifying the pressure from 5 to 200 pounds per square inch, the pressure being held for an hour at a specific temperature. The temperature of the melt was also held at 120° C. as the pressure holding time was varied from about 5 minutes to 2 hours. Photometric tests showed that a screen of polyethylene that was prepared as outlined above has the best "Q-rating" when the melt of 120° C. was held under a pressure of about 140 pounds per square inch for 1 hour. Such a screen material was found to be comparable to the best wax screen. Further examples relating to preparation of polymeric screen materials are disclosed in the above-identified patent application.

The invention has been described in detail with respect to a preferred embodiment thereof, but it will be understood that variations and modifications can be effected within the spirit and scope of the invention.

I claim:

1. A rear projection screen comprising:
   a sheet of polymeric material consisting essentially of a single polyolefin;
   said material being of generally crystalline structure and generally comprising randomly oriented anisotropic domains of various sizes.

2. A rear projection screen in accordance with claim 1 wherein each of said domains comprises a spherulite.

3. A rear projection screen in accordance with claim 2 wherein said spherulites comprise at least 60 percent of the screen mass.

4. A rear projection screen in accordance with claim 2 wherein a major share of said spherulites have an average diameter of from about 5 to about 20 microns.

5. A rear projection screen in accordance with claim 1 in which said polymeric material is polyethylene.

6. A rear projection screen in accordance with claim 1 in which said polymeric material is polypropylene.

7. A rear projection screen in accordance with claim 1 wherein said sheet has a thickness of about 20 to 80 mils.

8. A rear projection screen comprising:
   a sheet of material consisting essentially of polyethylene having a thickness of about 20 to 80 miles;
   said material being of generally crystalline structure and generally comprising randomly oriented anisotropic spherulites of various sizes.

9. A rear projection screen in accordance with claim 9 wherein said spherulites comprise from about 60 percent to about 90 percent of the screen mass.

10. A rear projection screen in accordance with claim 8 wherein a major share of said spherulites have an average diameter of from about 5 to about 20 microns.